United States Patent [19]

Guillou et al.

[11] 4,097,616

[45] Jun. 27, 1978

[54] LOW TEMPERATURE SOFT CANDY PROCESS

[75] Inventors: Jean Pierre Guillou, Paris; Georges Letourneau, Lagny, both of France

[73] Assignee: General Foods France, S.A., Montreuil-sous-Bois, France

[21] Appl. No.: 758,537

[22] Filed: Jan. 12, 1977

[30] Foreign Application Priority Data

Jan. 23, 1976 France .................................. 76 01906

[51] Int. Cl.² .............................................. A23G 3/00
[52] U.S. Cl. .................................... 426/548; 426/659; 426/660; 426/572
[58] Field of Search ................ 426/659, 660, 572, 658, 426/548

[56] References Cited

U.S. PATENT DOCUMENTS

| 3,512,995 | 5/1970 | Reed et al. | 426/659 |
| 3,518,095 | 6/1970 | Harding | 426/659 |
| 3,745,022 | 7/1973 | Broeg et al. | 426/660 |
| 3,908,032 | 9/1975 | Didelot et al. | 426/660 |
| 3,914,434 | 10/1975 | Bohni | 426/548 |

*Primary Examiner*—Jeanette M. Hunter
*Attorney, Agent, or Firm*—Howard J. Newby; Thomas V. Sullivan; Bruno P. Struzzi

[57] ABSTRACT

A process is provided for the manufacture of soft candy in which a finely subdivided crystalline sweetener is blended with a binder and other ingredients of soft candy at relatively low temperatures (below 60° C) and with controlled amounts of moisture to form a soft paste which is formed into a rope or sheet, cooled, subdivided and wrapped. The sequence enables the effective and efficient use of standard chewing gum/bubble gum processing equipment to produce a soft candy in which the sweetener has retained its crystallinity during processing and the resulting soft candy product, therefore, has excellent textural qualities and good storage stability.

4 Claims, No Drawings

LOW TEMPERATURE SOFT CANDY PROCESS

BACKGROUND OF THE INVENTION

The present invention relates to a process for making candy and more particularly, for making so-called "soft candies" (pate molle), sometimes also referred to as "chewing paste". As disclosed in U.S. Pat. No. 3,908,032, soft candy also includes such confections as fondant which, though soft, is essentially sucrose with some invert sugars and gelatinous candy which has a high content of gelatin and a characteristic gelatinous texture. Soft candy, unlike hard candy of the "acidulous" type, can readily be chewed in the mouth and is slowly dissolved in saliva during such chewing. Unlike "chewing gum," it is eventually entirely dissolved in the mouth and leaves no solid residue.

DESCRIPTION OF THE PRIOR ART

Soft candy usually comprises sugar, glucose, fat and gelatin. In addition, one or more flavoring agents, an authorized acidulating agent and suitable coloring matter are usually added in order to impart the desired flavor and color. The amounts of the various components may be within relatively broad ranges depending upon the desired shelf-life characteristics. However, as a general rule, the weight ranges are as follows:

| | | | | |
|---|---|---|---|---|
| sugar (sucrose) | From | 10% | to | 98% |
| glucose | | 0 | | 85% |
| fat | | 0 | | 10% |
| plastic binder (for example gelatin) | | 0.5% | | 5% |
| invert sugar | | 0 | | 2% |
| flavor | | 0.1% | | 3% |
| acidulating agent | | 0.2% | | 2% |
| color | | 0.001% | | 0.1% |
| water | balance | | | |

Those skilled in the art are well aware of appropriate proportions whether or not within the above range and are aware of other sweeteners which can be substituted for the sucrose and/or glucose. The proportions are those which give the characteristic texture of a "soft candy" of the "pate molle" type.

In soft candy, the sweetener, usually sugar (sucrose) and/or glucose, are essentially present in crystallized or uncrystallized form, fat and plastic binder being provided to render the paste coherent and elastic. As a plastic binder, gelatin is advantageously used but other substances such as pectin, dextrin or gelatinous substances known to the art can be employed.

The conventional process for the manufacture of soft candy entails preparing, at a temperature of 90° C to 110° C, an aqueous solution (syrup) of sugar and glucose and then concentrating the solution to 6% to 10% moisture by evaporative means at temperatures ranging from about 125° C to about 145° C, depending upon the type of evaporators employed. To the aqueous concentrate of sugar (sucrose) and glucose are added fat, binder, flavor, acidulating agent, and color. The resulting paste is thoroughly mixed to form a uniform composition, is then cooled to the appropriate temperature, and beat with or without stretching. The mass is then permitted to stand and cool and can then be appropriately shaped for feeding a cutting-packaging machine.

The conventional prior art process for the manufacture of soft candy has several processing drawbacks — i.e. expensive processing equipment, large energy requirements, particularly for concentrating the syrup, and extensive hold-up periods for properly cooling the soft candy mass during stages of processing to be able to subdivide and wrap properly. Additionally the high temperature processing adversely affects the flavoring components, particularly natural flavorings and causes the gelatin in the formulation to lose its elasticity.

Also, such a process tends not to be completely satisfactory because the resulting candy, although having the desired plasticity upon completion of the manufacturing process, is found to become rapidly hard and thereby to lose its plasticity after a relatively short storage period. Such a drawback is especially undesirable in products which would otherwise be satisfactorily preserved, because said products would be perfectly adapted to consumers if such hardening phenomenon did not render them commercially unsuitable.

There is a need for a process for making soft candy, the plasticity of which is not substantially affected upon aging, and which thus remains commercially suitable after an extended storage period.

There is also a need for a process for making soft candy which can be accomplished with much less equipment and less production space than that required by the classical prior art process for the same production capacity. More particularly, there is a need for a soft candy process which does not require an evaporation step to produce an aqueous concentrate of sweetener.

Additionally, there is a need for a soft candy process which employs standard equipment which can be used for the production of other types of confections and gums — thus, lending economical versatility in confectionery plant production.

Further, there is a need for a soft candy process which enables the use of heat sensitive and/or water sensitive ingredients for the production of superior variants of the conventional soft candy products.

According to the invention there is provided a process for making soft candy at temperatures below 60° C and with controlled amounts of moisture in standard chewing gum/bubble gum processing and packaging equipment.

The novel processing features of the invention include the blending, at temperatures below 60° C, of finely subdivided crystalline sweetening ingredients with a binder and with only sufficient water to provide a soft paste which is amenable to formation into rope or sheet form, which is then cut into suitably sized units and individually wrapped. Importantly, all of the processing operations take place in standard chewing gum/bubble gum processing and packaging equipment without the need for any evaporative operational step and, therefore, without the sweetener losing its crystallinity during processing.

SUMMARY OF THE INVENTION

Basically, the invention process entails making a substantially dry mix of finely divided crystalline sweetener, gelatin or other binder and, if desired, glucose and a minor quantity of fat (or oil). The glucose (if employed), binder and fat process very similar to that of a chewing gum base and form the matrix within which the finely subdivided crystalline sweetener is uniformly distributed and embedded along with the color, flavor, and other appropriate additives. Critical, therefore, to the practice of the invention and the production of satisfactory soft candy product is the use of a finely subdivided crystalline sweetener blended with the other soft candy ingredients under processing conditions of low temperature and controlled amounts of moisture such that the sweetener does not lose its crystallinity (and therefor does not recrystallize upon storage of the product) by melting and/or dissolution throughout the entire sequence of processing steps.

DESCRIPTION OF THE PREFERRED EMBODIMENTS

Sucrose is the sweetening agent employed in the formulations of the soft candies of the invention which are designed to have the conventional level of nutritional caloric content. Other suitable crystalline sweetening agents are also suitable for purposes of the candies of the invention which are formulated to provide a lesser caloric value or have unique organoleptic affects such as cool mouthfeel. Among the many crystalline sweeteners, other than sucrose, which are satisfactory for soft candies prepared by the inventive process are lycasine, xylitol, mannitol, sorbitol and other polyhydric alcohols.

A replacement of sucrose with xylitol yields a soft candy having excellent texture, good storage stability and a pleasant cooling mouthfeel as prepared by the method of the invention. In effect, it has been established that xylitol can be employed as a full and complete replacement for sucrose to bring about a unique soft candy which, by the method of the invention, has all of the attributes of the sucrose-containing product plus the advantage of a lower caloric content and a pleasant cooling effect when eaten.

In order to obtain the necessary degree of fineness of sugar particle size to impart a smooth texture to the soft candy product, the commercial food sweetener is passed through a micropulverizer and screened through a fine screen cloth such as a screen cloth having ASTM No 200 (mesh opening = 0.074 mm) specifications. The grinding and screening should take place in a dehumidified area wherein the relative humidity is 0.10% to insure no clumping of the sweetener. Preferably, the sweetener is blended with the other soft candy ingredients within 15 minutes after being pulverized or is stored under appropriate conditions to prevent sorbing moisture.

Commercial grade glucose (dextrose) such as spray dried corn syrup solids produced by Corn Products Co. (France) and having a particle size specification of "MOR SWEET" TM 4× size has been determined to be a satisfactory component of the formulation. Gum arabic, preferably in a 50% aqueous solution can be employed to replace glucose in some formulations particularly those in which sucrose is not employed as the sweetener.

In those formulations for a soft candy of the invention having low nutritive value such agents as dipeptide sweeteners, particularly L-aspartyl-L-phenylalanine, methyl ester, saccharine, cyclamates, glycyrrhizin and other non-nutritive sweeteners can be employed, particularly with a modified polydextrin or glucose polymer as a bulking agent.

The binder is preferably edible grade gelatin and most preferably an aqueous sol of gelatin having a water content of approximately 67% by weight. In those instances where gelatin is the binder it is the aqueous sol of gelatin that furnishes the bulk of the water essential to forming the soft paste of homogenized ingredients when mixed at the low temperatures prior to formation. When necessary, minor adjustment in moisture content of the paste can be effected by the addition of water.

For the most part, the addition of any fat to the formulation for the low temperature processing of the soft candy paste is optional and, for soft candies of low caloric content, is eliminated. The fat content can be eliminated or increased to within the above-mentioned range because it has little, if any, influence on the flavor or textural properties even when at the maximum value of the range. The primary purpose of the fat is to facilitate the machine wrapping of the soft candy product and a food grade hydrogenated palm oil as a component in the formulation has been determined to be satisfactory for this purpose.

The coloring, flavoring and acidulating agents employed in the soft candy formulation are the same as those employed in the prior art conventional process for making soft candy and are well known to those skilled in the confectionery manufacturing art.

As the mixture of the ingredients are processed under relatively mild temperature conditions (60° C or below) it is essential that all ingredients be pure and of edible grade and processing conditions be maintained in a strict sense of cleanliness in order to minimize any contamination. A small, but effective, amount of antibacterial agent can be employed in the formulation when considered necessary.

With respect to processing, basically, the inventive process entails making a substantially dry mix of the finely subdivided crystalline sweetener, gelatin or other binder, a minor quantity of fat (optional), coloring and other additives. The mix is thoroughly blended at a temperature below 60° C but at a temperature sufficiently elevated to soften the fat constituent. Only an amount of water sufficient to provide a soft paste is present and care must be taken to avoid dissolution and/or melting of the sweetener components.

The mixing and forming steps of the process are particularly significant. For example when employing sucrose as the sweetener and glucose and gelatin sol as the matrix base, the blending of the glucose and gelatin takes place in the heavy duty mixer prior to the addition of the sugar and other ingredients. It has been found that it requires approximately 2 - 3 minutes to satisfactorily blend these two components while at a temperature of approximately 60° C — a temperature at which the gelatin sol is in a liquid state. The crystalline sugar, at ambient temperature, is then added to the mixer. The introduction of this bulk of material quickly lowers the temperature of the blend to about 40° - 45° C at which temperature the mass is blended for an additional 3 minutes. It is important that the temperature of the sugar-containing blend not exceed 50° C because the sugar will melt at or above this temperature and will be converted to a noncrystalline form and thereby have an adverse impact on product density and shelf life. Any incipient melting of the sugar would provide it with the capability of absorbing moisture from the gelatin which, in turn, would result in a finished product having a hard candy texture. When fat is employed in the formulation, however, the temperatures at which mixing takes place must, of course, while being below the melting point of the sugar, be above the softening point of the fat. The flavoring ingredients, usually being heat sensitive, are preferably added at the time of adding the sucrose.

The coloring matter, flavoring agents and acidulating agent can, in principle, be added at any stage under such conditions that they can be satisfactorily distributed through the mass so as to provide a homogeneous paste.

However, the most appropriate time in the processing for the addition of the coloring, flavoring and acidulating agents to the blend has been determined to be after approximately one-half the sugar has been added to the blend.

Coloring agents are usually relatively heat-insensitive and therefore can be distributed through the soft paste at most any stage in the processing. A color distribution, as uniform as possible, is thus achieved, which is commercially critical. On the contrary, flavoring agents are relatively heat-sensitive and it is therefore advantageous to add them into the previously cooled paste at such a process stage that a sufficiently homogeneous distribution of the flavoring matters through the paste will nevertheless be provided. Therefore, as a practical matter, quite satisfactory results are obtained when both the coloring and flavoring agents are added together after one-half the sugar has been added to the batch of material. The present low temperature mixing process has the further inherent advantage of not detrimentally affecting flavor of the finished product.

The success of the method of the invention and, in effect, the essence of the invention is the discovery that a finely powdered crystallized sweetener can be employed as one of the starting ingredients and, if the sweetener is not dissolved and recrystallized during processing, the resulting product is a soft candy having good textural qualities and excellent shelf life.

The formulations for soft candies produced by the low-temperature method of the invention therefore, require pulverized sweetener, commercially designated as "4×" or finer and, preferably, spray dried glucose or dextrose of a similar particle size when employed as ingredients. In general, all ingredients of a solid and/or crystalline structure should, preferably be of an average particle size of 100 microns or less.

As previously stated, for candies of low nutritive value, sucrose and/or glucose are replaced, wholly or partially with a finely pulverized sweetener having no or minor levels of nutritional value.

A very suitable mixer is a blender which comprises parallel axis stirrers in opposed rotation inside a tank with take-off by a screw extruder. The screw extruder has preferably a web forming nozzle. A mixer/extruder of this type manufactured by the J. H. Day Co. of Cincinnati, Ohio, U.S.A. has been determined to be satisfactory for the low-temperature processing of the soft candy paste in accordance with the concepts of the invention.

Alternatively, a jacketed Sigma-blade mixer of the tilt-type for emptying may be employed in conjunction with a separate batch roller or extruder to receive the soft, well mixed paste from the mixer, and form it into ropes or slabs for cooling prior to packaging.

The method of the invention is also amenable to the use of continuous extrusion equipment, particularly for large scale operations.

The rate and period of mixing and the rate of removal from the mixing by the extruder must be such that the desired crystallinity and texture are obtained. The adjustment of the temperature during the blending is very important but one skilled in the art would have no difficulty in the light of the general teaching of this application in adjusting the operation of the mixer and former to give a desired texture for a given composition.

The soft candy paste, after an appropriate blending time is removed from the mixer/former by a feed screw which forces the paste through the former die in the form of rods as sheets onto a cooling belt. The cooled rods or sheets are discharged from the cooling belt to cutting machines and thereafter the candy can be packaged and bagged.

The proportions of the various components such as water, fat, sugar and glucose will generally be within the proportions indicated at the beginning of this application but such selection is well within the understanding of one normally practiced in the art. Equally the precise temperatures which will be used can be modified in accordance with the teachings hereinabove so as to insure that the desired consistency of the product is obtained.

In order that the present invention may be more clearly understood, reference will now be had to the following example which illustrates the various facets of the invention. It should be understood, however, that the example is meant to be illustrated and the invention is not to be limited thereto.

EXAMPLE I

A raspberry flavored soft candy having excellent texture and storage stability was manufactured by the low-temperature process of the invention as described hereinbelow.

| Ingredient | Formulation Weight Per Cent |
|---|---|
| Confectionery sugar (100 microns) | 60.2% |
| Atomized Glucose (100 microns) | 30.0% |
| Gelatin Sol (33% by wgt. gelatin) | 4.0% |
| Palm oil (shortening) | 4.0% |
| Flavoring, Coloring, Citric Acid | 0.2% |
| Added water | 1.6% |
| | 100.0% |

A 400 gram batch of the soft candy ingredients was added to and blended in a small kneading-trough (Baker-Perkins Sigma blade) as follows:

1. The mixer was preheated to a temperature of 45° – 50° C.
2. The atomized glucose was then blended with about one-third the weight of the crystalline sucrose until a very smooth and uniform blend was obtained (about 2 – 3 minutes).
3. The palm oil shortening was then added and blended (after completely melting) with the sugar and glucose.
4. The gelatin, color and citric acid was then uniformly blended into the base mixture and, finally
5. The remainder of the sugar, the flavor and the additional water to adjust the texture was added and the blending continued for about 2 to 4 minutes.

The uniformly blended soft candy paste was then extruded at very low pressure requirements (approximately 1 kilo/cm$^2$) to form a rope. The rope was cooled to room temperature and then fed to a cutting-packaging machine.

Further samples of soft candy were made as in the above example in which the ratio of ingredients were changed within the following percent by weight ranges.

| Sucrose | 52.4% | to | 11.6% |
|---|---|---|---|
| Glucose | 37.8% | to | 80.2% |

| -continued | | | |
|---|---|---|---|
| Gelatin Sol | | | |
| (33% by gelatin) | 4.0% | to | 8.0% |
| Palm oil | 4.0% | to | 0.0% |
| Water | 1.6% | to | 0.0% |

During the preparation of the sample of soft candy the weight ratio of ingredients were varied to effect desired different textures of soft candy products. For example, increasing the amount of gelatin produces a puffed-type soft candy. In fact, at the upper portion of the weight range, the candy has a texture resembling that of marshmallows. On the other hand, a decrease of the gelatin sol yields a more firmer, chewier textured soft candy.

EXAMPLE II

A sugarless mint flavored soft candy having the attributes of the candy of Example I plus imparting a pleasant cooling mouth-full was manufactured by the low-temperature process of the invention as follows:

| Ingredient | Formulation Weights Per Cent |
|---|---|
| Xylitol (100 microns) | 79.2 |
| Gum Arabic (50% aqueous solutions) | 4.75 |
| Gelatin Sol (.33% by wgt. gelatin) | 4.75 |
| Palm Oil (shortening) | 9.91 |
| Citric acid | 0.79 |
| Flavor (peppermint) | 0.59 |

A 252 gram batch of the soft ingredients were added to and blended in a small kneading-through (Baker-Perkins Sigma Blade) as follows:

1. The mixer was preheated to a temperature of 45° – 50° C.
2. The xylitol crystals were added to the mixer and then the palm oil was added. The xylitol crystals and palm oil were blended and warmed for about 4 minutes.
3. When the palm oil had warmed and was uniformly blended with the xylitol, the gelatin and gum arabic were added gradually followed by the addition of the peppermint flavor and citric acid.
4. The batch was then further blended for 6 minutes.
5. The uniformly blended soft candy was then shaped, cooled, subdivided and packaged as in Example I.

The xylitol soft candy had a fondant-like texture and retained its softness after extended periods of storage.

The embodiments of the invention in which an exclusive property or privilege is claimed are defined as follows:

1. A process for making a soft candy containing a sweetener substantially completely in the crystalline state and which does not lose its crystallinity throughout the process which consists of the steps of
   (a) admixing, at a temperature of from about 45° C. to about 60° C., to form a soft paste,
      (1) from about 85% to about 90% by weight of the final product of a crystalline sweetener selected from the group consisting of an edible polyhydric alcohol, sucrose, glucose and mixtures thereof, all of said sweetener having a particle size of 100 microns or less, with
      (2) a binder consisting of from about 4% to about 8% of an aqueous gelatin sol containing approximately 33% of gelatin by weight of the sol, and
      (3) minor, but effective, amounts of food coloring, flavoring and edible aciduant,
   (b) extruding the soft paste to form rods and/or sheets,
   (c) cooling the extruded rods and/or sheets of soft paste to room temperature, and
   (d) forming and shaping the cooled, extruded paste into candy units.

2. The process of claim 1 wherein the soft paste further contains up to 4% by weight of the final product of palm oil.

3. The process of claim 1 wherein the polyhydric alcohol is xylitol.

4. The process of claim 1 wherein the gelatin sol is replaced with a 50% aqueous solution of gum arabic.

* * * * *